United States Patent
Leibig et al.

(10) Patent No.: US 12,234,311 B2
(45) Date of Patent: Feb. 25, 2025

(54) AMPHIPHILIC BLOCK COPOLYMER

(71) Applicant: BYK-Chemie GmbH, Wesel (DE)

(72) Inventors: Daniel Leibig, Wesel (DE); Holger Frey, Wesel (DE); Patrick Verkoyen, Wesel (DE); Astrid Rudolfi, Wesel (DE); Udo Krappe, Wesel (DE); Jan Blankenburg, Wesel (DE); Guillaume Wojciech Jaunky, Wesel (DE)

(73) Assignee: BYK-Chemie GmbH, Wesel (DE)

( * ) Notice: Subject to any disclaimer, the term of this patent is extended or adjusted under 35 U.S.C. 154(b) by 378 days.

(21) Appl. No.: 17/798,920

(22) PCT Filed: Mar. 4, 2021

(86) PCT No.: PCT/EP2021/055423
§ 371 (c)(1),
(2) Date: Aug. 11, 2022

(87) PCT Pub. No.: WO2021/175972
PCT Pub. Date: Sep. 10, 2021

(65) Prior Publication Data
US 2023/0095096 A1    Mar. 30, 2023

(30) Foreign Application Priority Data
Mar. 6, 2020 (EP) .................... 20161594

(51) Int. Cl.
| | |
|---|---|
| C08F 283/06 | (2006.01) |
| C08G 65/08 | (2006.01) |
| C08G 65/24 | (2006.01) |
| C08G 65/26 | (2006.01) |
| C09B 67/00 | (2006.01) |
| C09C 3/10 | (2006.01) |
| C09D 7/65 | (2018.01) |
| C09D 17/00 | (2006.01) |
| C09K 23/16 | (2022.01) |
| C09K 23/42 | (2022.01) |

(52) U.S. Cl.
CPC ............ *C08F 283/06* (2013.01); *C08G 65/08* (2013.01); *C08G 65/24* (2013.01); *C08G 65/2609* (2013.01); *C08G 65/2624* (2013.01); *C09D 7/65* (2018.01); *C09D 17/005* (2013.01); *C09K 23/16* (2022.01); *C09K 23/42* (2022.01); *C08G 2650/50* (2013.01); *C08G 2650/58* (2013.01); *C09B 68/4235* (2013.01); *C09C 3/10* (2013.01)

(58) Field of Classification Search
CPC ......... C09D 17/005; C09D 7/45; C09D 7/65; C09C 3/10; C08G 2650/50; C08G 2650/58; C08G 65/08; C08G 65/22; C08G 65/24; C08G 65/2609; C08G 65/2624; C08G 65/3322; C08G 65/33358; C08G 63/664; C08G 63/6882; C08G 18/0814; C08G 18/283; C08G 18/4837; C08G 18/4887; C08G 18/5021; C08G 18/6216; C08G 18/7621; C08G 18/7831; C08F 283/06

See application file for complete search history.

(56) References Cited

U.S. PATENT DOCUMENTS

| | | | |
|---|---|---|---|
| 3,403,114 A * | 9/1968 | Vandenberg ........... | C08G 65/22 528/416 |
| 8,058,388 B2 | 11/2011 | Sellman et al. | |
| 2011/0257326 A1 | 10/2011 | Jaunky et al. | |

FOREIGN PATENT DOCUMENTS

| | | |
|---|---|---|
| CN | 107337767 A | 11/2017 |
| EP | 626977 A1 | 12/1994 |
| EP | 0556649 B1 | 6/1999 |
| EP | 1240255 B1 | 9/2004 |
| EP | 2065427 A1 | 6/2009 |
| WO | 9317057 A1 | 9/1993 |

OTHER PUBLICATIONS

International Search Report and Written Opinion for International Application No. PCT/EP2021/055423 dated Apr. 6, 2021 (10 pages).

(Continued)

*Primary Examiner* — Christopher M Rodd

(57) ABSTRACT

The invention relates to block copolymer comprising i) A first block wherein at least 65 mol-% of the repeating units of the first block are repeating units of the formula (I)—[$CH_2$—$CH_2$—O]—, ii) A second block wherein at least 90 mol-% of the repeating units of the second block are repeating units of at least one of formulae (II) or (III), wherein the groups $R^1$, $R^2$, and $R^3$ independent of each occurrence are selected from hydrocarbyl groups having 1 to 40 carbon atoms, which are optionally substituted by ether or hydroxyl groups, and wherein the groups $R^1$ and $R^2$ are optionally linked to each other such that a nitrogen heterocyclic structure is present, iii) A third block which is different from the first block and the second block and which is more hydrophobic than the first block.

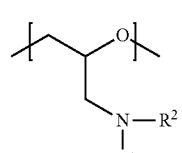

(II)

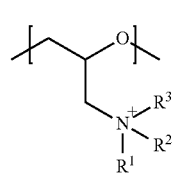

(III)

17 Claims, No Drawings

(56) References Cited

OTHER PUBLICATIONS

J. Blankenburg et al, "Well-Defined Multi-Amino-Functional and Stimuli-Responsive Poly(propylene oxide) by Crown Ether Assisted Anionic Ring-Opening Polymerization", Macromolecules, vol. 50, No. 22, Nov. 28, 2017, pp. 8885-8893.
H. Gilman et al., "Synthesis of 1-Diethylamino-2, 3-epoxypropane, 3-Diethylamino-2-hydroxypropylamine; and 4-Diethylamino-3-hydroxybutylamine," Jul. 1946, vol. 68, pp. 1291-1293.
J. Herzberger et al., "Stimuli-Responsive Tertiary Amine Functional PEGs Based on N, N-Dialkylglycidylamines," ACS Publications, Macromolecules 2014, vol. 47, pp. 7679-7690.
B. Obermeier et al., "Amino Functional Poly(ethylene glycol) Copolymers via Protected Amino Glycidol," Macromolecules 2010, vol. 43, pp. 2244-2251.
V. Reuss et al., "N, N-Diallylglycidylamine: A Key Monomer for Amino-Functional Poly(ethylene glycol) Architectures," CS Publications, Macromolecules 2012, vol. 45, pp. 4581-4589.

* cited by examiner

AMPHIPHILIC BLOCK COPOLYMER

The invention relates to a block copolymer comprising at least three blocks, to a composition comprising the block copolymer and solid particles, to a process of dispersing solid particles, and to the use of the block copolymer as a wetting and/or dispersing agent for solid particles.

Wetting and dispersing agents for solid particles, such as pigments and/or fillers, are generally known. EP 1240255 A describes a pigment dispersion comprising an ABC-block polymer dispersant. The A, B, and C segments of the ABC-block polymer consist essentially of polymerized (meth)acrylate monomers.

WO 93/17057 relates to linear methacrylic ABC triblock polymers in which the composition of each of the three blocks is different, and having at least one hydrophilic block and at least one hydrophobic block.

Frey et al. describe in Macromolecules, (2017), pp. 8885-8893 block copolymers and statistical copolymers prepared by anionic ring-opening polymerization of propylene oxide and N,N-diethyl glycidyl amine.

CN 107337767 A relates to polycarboxylate water-reducers having phosphorous acid groups and their use in concrete mixtures. This document describes intermediates, obtained by reacting propylene oxide, ethylene oxide and epichlorohydrin, followed by amination reaction with diethanolamine or bis(2-hydroxypropyl)amine. The intermediates contain a single unit derived from propylene oxide.

There is an ongoing need to provide copolymers suitable as wetting and/or dispersing agents for solid particles, which can be used for a broad range of pigments and are suitable for a broad range of compositions. Thus, the wetting and dispersing agent should enable good dispersion of various types of pigments, including organic as well as inorganic pigments, and carbon black. It is also desirable that the pigment dispersions can be combined with a wide variety of coating and polymer compositions, ranging from polar to non-polar compositions.

The invention provides block copolymer comprising
i) A first block wherein at least 65 mol-% of the repeating units of the first block are repeating units of the formula (I)

—[CH$_2$—CH$_2$—O]— (I), ii) A second block wherein at least 90 mol-% of the repeating units of the second block are repeating units of at least one of formulae (II) or (III),

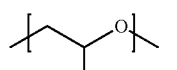

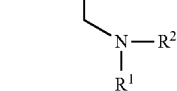

wherein the groups R$^1$, R$^2$, and R$^3$ independent of each occurrence are selected from hydrocarbyl groups having 1 to 40 carbon atoms, which are optionally substituted by ether or hydroxyl groups, and wherein the groups R$^1$ and R$^2$ are optionally linked to each other such that a nitrogen heterocyclic structure is present, iii) A third block which is different from the first block and the second block and which is more hydrophobic than the first block.

It should be noted that the numbering of the blocks as used above does not necessarily indicate the sequence of the blocks in the copolymer. In the copolymer, the first block, the second block and the third block may be arranged in any desired sequence. In one embodiment, the first block is located between the second block and the third block. In an alternative embodiment, the third block is located between the first block and the second block. In a preferred embodiment, the second block is located between the first block and the third block.

As mentioned above, at least 65 mol-% of the repeating units of the first block are units of formula —[CH$_2$—CH$_2$—O]— (I). In some embodiments, 85 to 100 mol-% of the repeating units of the first block are units of formula (I). In a specific embodiment, the first block consists essentially of repeating units of formula (I).

Repeating units of formula (I) are the result of a ring opening polymerization reaction of ethylene oxide. In addition to repeating units of formula (I), other repeating units may be present in the first block. Examples of other repeating units in the first block are repeating units resulting from the ring opening polymerization of other cyclic monomers. Such cyclic monomers include epoxides, such as propylene oxide, butylene oxide and other alkylene oxides, glycidylethers, oxetanes, tetrahydrofuran, and lactones. The repeating units in the first block may be distributed within the block randomly or non-randomly.

In typical embodiments the first block is terminated by a hydrocarbyl group having 1 to 20 carbon atoms. Examples of suitable hydrocarbyl groups are aliphatic and aromatic hydrocarbyl groups. In preferred embodiments, the first block is terminated by an alkyl group having one to 12 carbon atoms. Preferred examples of alkyl groups include methyl, ethyl, propyl, butyl, pentyl, and hexyl groups.

The first block generally comprises 10 to 100 repeating units of formula (I). In preferred embodiments, the first block comprises 20 to 90 repeating units of formula (I).

Polymers to be used as first block are commercially available. Suitable commercially available examples include polyethyleneglycol monomethylether (mPEG) of various molecular weights.

The block copolymer comprises a second block, which is located between the first block and the third block.

At least 90 mol-% of the repeating units of the second block are repeating units of at least one of formulae (II) or (III),

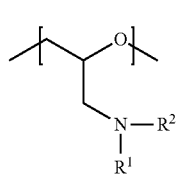

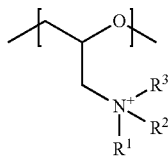

(III)

The groups $R^1$, $R^2$, and $R^3$ independent of each occurrence are selected from hydrocarbyl groups having 1 to 40 carbon atoms, which are optionally substituted by ether or hydroxyl groups. It is preferred that the groups $R^1$, $R^2$, and $R^3$ independent of each occurrence are selected from hydrocarbyl groups having 1 to 18 carbon atoms, which are optionally substituted by ether or hydroxyl groups.

In preferred embodiments, the groups $R^1$ and $R^2$ are groups having 2 to 18 carbon atoms.

In some embodiments, the groups $R^1$ and $R^2$ are linked to each other such that a nitrogen heterocyclic structure is present. In this case, $R^1$ and $R^2$ together preferably have 4 to 10 carbon atoms. The nitrogen heterocyclic structure preferably is a 5-, 6-, or 7-membered ring.

The group $R^3$ suitably is a hydrocarbyl group having 1 to 7 carbon atoms. In typical embodiments, the group $R^3$ in formula (III) is a $C_1$ to $C_4$ alkyl group or a benzyl group.

The repeating units of formula (II) are obtainable by ring opening polymerization of suitable glycidyl amines of the general formula (V).

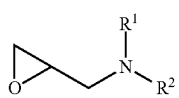

(V)

In formula (V), the groups $R^1$ and $R^2$ are defined as above for formula (II).

Examples of preferred glycidylamines include dimethyl glycidylamine, diethyl glycidylamine, di-n-propyl glycidylamine, di-iso-propyl glycidylamine, di-n-butyl glycidylamine, di-iso-butyl glycidylamine, diamyl glcyidylamine, diisoamyl glycidylamine, di-n-hexyl glycidylamine, di-n-heptyl glycidylamine, di-n-octyl glycidylamine, dinonyl glycidylamine, didecyl glycidylamine, di(2-ethyl-hexyl) glycidylamine, didodecylglycidylamine, dicyclohexyl glycidylamine, diphenyl glycidylamine, dibenzyl glycidylamine, diallyl glycidylamine, dipropargyl glycidylamine, pyrrolidine glycidylamine, piperidine glycidylamine, morpholino glycidylamine, pyrrole glycidylamine, methylpyrrolglycidylamine, dimethylpyrrol glycidylamine, imidazolino glycidylamine, and pyrazol glycidylamine.

In some embodiments, the groups $R^1$ and $R^2$ in the glycidyl amine of formula (V) are not identical. Examples of such glycidyl amines are methyl ethyl glycidyl amine, methyl propyl glycidyl amine, ethyl hexyl glycidyl amine, or butyl octyl glycidylamine.

If so desired, mixtures of two or more different glycidyl amines may be used for preparing the second block.

Particularly preferred glycidylamines are diethyl glycidylamine, di-n-butyl glycidylamine, and pyrrolidine glycidylamine.

Glycidylamines can be prepared by known methods, for example by reaction of epichlorohydrin and secondary amines. Such reactions are described by Gilman et al. in Journal of the American Chemical Society, 1946, 1291-1293. The preparation of dibenzyl glycidylamine is described by Frey et al. in Macromolecules, 2010, 43, 2244-2251. The preparation of various glycidylamines is described by Frey et al. in Macromolecules 2014, 47, 7679-7690.

The repeating units of formula (III) are obtainable by quaternization of the tertiary amine group of the repeating units of formula (II) with suitable quaternization agents. Examples of suitable quaternization agents are alkyl halides, benzyl halides, dialkylsulfates, alkyl tosylates, and epoxides. The quaternary ammonium groups generally have anions as counter ions. In preferred embodiments, the counter ions of the repeating units of formula (III) comprise at least one of chloride, bromide, iodide, tosylate, methylsulfate, and carboxylate.

Generally, the number of repeating units in second block is lower than the number of repeating units in the first block or in the third block. In preferred embodiments, the sum of repeating units for formulae (II) and (III) in the second block is in the range of 2 to 10.

In some embodiments, the tertiary amine group of repeating unit (II) are present in salt form, i.e. they are partly or entirely neutralized by an acid. Examples of suitable acids include carboxylic acids, phosphoric acid, acidic phosphoric acid esters, and sulfonic acids.

In some embodiments, the second block comprises repeating units which are different from the repeating units of formulae (II) and (III).

Examples of such other repeating units are those obtained by ring opening of epoxides as mentioned above for the first block.

It is further preferred that the second block consists essentially of repeating units of formulae (II) and (III).

The block copolymer of the invention further comprises a third block which is different from the first block and the second block and which is more hydrophobic than the first block.

Hydrophobic means the tendency to repel water or failure to mix with water. The third block therefore has less affinity to water than the first block.

In some embodiments the third block comprises repeating units of the formula (IV)

$$-[CH_2-CHR^4-O]- \quad (IV),$$

wherein the groups $R^4$ independent of each occurrence are selected from hydrocarbyl groups having 1 to 18 carbon atoms, which are optionally substituted by ether groups. In some preferred embodiments, $R^4$ is a methyl group or an ethyl group.

Repeating units of formula (IV) are obtainable by ring opening polymerization reaction of epoxides. Examples of suitable epoxides are propylene oxide, butylene oxide, and glycidylethers, such as ethyl hexyl glycidyl ether, dodecyl glycidyl ether, phenyl glycidyl ether, cresyl glycidyl ether, and mixtures thereof.

In typical embodiments, the third block comprises 15 to 100 repeating units of formula (IV).

In further embodiments, the third block comprises repeating units obtainable by ring opening polymerization of cyclic ethers having a four- or five-membered ring, such as oxetanes and tetrahydrofuran.

In further embodiments, the third block comprises repeating units having ester-functional groups. Such repeating units are obtainable by ring opening polymerization of cyclic esters. Examples of suitable cyclic esters are c-caprolactone, valerolacton, mixtures thereof, and lactide.

The repeating units in the third block may be distributed within the block randomly or non-randomly.

In some embodiments, the blocks of the block copolymer are connected by linking groups. In a typical embodiment, a linking group comprises two urethane groups. Linking groups having two urethane groups are obtainable by reacting hydroxyl group-terminated pre-formed blocks with a diisocyanate. Preferred diisocyanates for this purpose are 2,4-toluene diisocyanate and isophorone diisocyanate. In some embodiments, the third block is linked to the second block via a linking group having two urethane groups.

In other embodiments, the blocks of the block copolymer are linked via an ester group or via an ether group. Block copolymers wherein the blocks are linked by an ester group are obtainable by reacting a hydroxyl group-terminated pre-formed block with an ester forming agent, for example a cyclic ester as described above. Block copolymers wherein the blocks are linked by an ether group are obtainable by reacting a hydroxyl group-terminated pre-formed block with an ether forming agent, in particular an epoxide. In some embodiments, the third block is linked to the second block via an ester or ether group.

Generally, the block copolymer of the invention is essentially linear.

The invention also relates to a process of preparing the block copolymer. The process comprises the steps of
a) Providing a first polymer block having at least 65 mol-% of repeating units of the formula (I) —[CH2-CH2-O]—, and having one end group selected from hydroxyl and secondary amine,
b) Providing a glycidyl amine of the general formula (V)

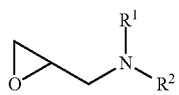

(V)

wherein $R^1$ and $R^2$ are defined as above, and subjecting the glycidylamine of formula (V) to ring opening polymerization in the presence of the first polymer block provided in step a) to prepare a diblock copolymer
c) Providing a monomer mixture comprising at least one of epoxide and lactone, and subjecting the monomer mixture to ring opening polymerization in the presence of the diblock copolymer prepared in step b).

In a preferred embodiment, the first polymer block provided in step a) consists essentially of repeating units if formula (I), and it terminated at one end by an alkyl group having 1 to 12 carbon atoms, and is terminated at the other end by a hydroxyl group.

In some embodiments, the first polymer block is prepared by ring-opening polymerization of a monomer mixture comprising at least 65 mol-% of ethylene oxide. The ring opening polymerization is suitably carried using a starter alcohol selected from methanol, ethanol, n-propanol, iso-propanol, n-butanol, iso-butanol, or tert.-butanol. Methanol, ethanol, and n-butanol are preferred starter alcohols.

In a preferred embodiment, the monomer mixture provided in step c) comprises at least one of propylene oxide, butylene oxide, cresyl glycidyl ether (2,3-Epoxypropyl-o-tolylether), 2-ethylhexyl glycidyl ether, a mixture of C13/C15-alkyl glycidyl ether, a mixture of C12/C14-alkyl glycidyl ether, and epsilon-caprolactone, delta-valerolactone or an mixture of epsilon-caprolacton and delta-valerolactone.

In an alternative embodiment, in step c) of the process a pre-formed third polymer block which is more hydrophobic than the first block and having one hydroxyl group is provided, and linked to the di-block copolymer prepared in step b) by reaction with a diisocyanate. In a preferred embodiment, the pre-formed third block is first reacted with a diisocyanate to form an isocyanate terminated third block, which is subsequently linked to the di-block copolymer prepared in step b).

In preferred embodiments, the ring opening polymerizations for preparing the first, second or third block of the block copolymer is a base catalyzed anionic ring opening polymerization. Examples of suitable bases include alkali metal hydroxides and alkali metal alkoxides. It is also possible to conduct the ring opening polymerizations as cationic polymerizations. Other known ring opening polymerizations may be used as well, for example double metal cyanide catalysis, as described in EP 2065427 A1.

The block copolymer of the invention generally has terminal groups selected from hydroxyl groups and alkyl groups. If so desired, hydroxyl end groups can be converted to ether or ester groups by reaction with suitable reagents.

The block copolymer of the invention is very suitable as a wetting and/or dispersing agent for solid particles. Therefore, the invention also relates to a composition comprising solid particles and the block copolymer according to the invention. Preferred examples of solid particles are pigments and fillers. The invention further relates to the use of the block copolymer as a wetting and/or dispersing agent for solid particles.

Representative examples of solid particles include pigments, fillers, flame retardants, and fibers.

The pigments may be those known to a skilled person. The pigments may be organic pigments or inorganic pigments as well as carbon black.

Examples of suitable organic pigments include mono-, di-, tri- and polyazo pigments, oxazine, dioxazine, thiazine pigments, diketo pyrrolopyrroles, phthalocyanines, ultramarine and other metal complex pigments, indigoid pigments, diphenylmethane pigments, triarylmethane pigments, xanthene pigments, acridine pigments, quinacridone pigments, methine pigments, anthraquinone, pyranthrone, perylene pigments and other polycyclic carbonyl pigments.

When the solid particles to be dispersed are organic pigments, improved results have been obtained with block copolymers having repeating units of formula (III). In a preferred embodiment, the composition comprises at least one type of solid particles which are an organic pigment, and a block copolymer having repeating units of formula (III).

In some embodiments, the pigments are carbon black pigments and/or pigments based on carbon black, such as graphite. When carbon black is to be dispersed, improved results have been obtained with block copolymers having repeating units of formula (II). In a preferred embodiment, the composition comprises at least one type of carbon black particles and a block copolymer having repeating units of formula (II).

In a further embodiment, the pigments are inorganic pigments, such as zinc, titanium dioxide, zinc oxide, zinc sulfide, zinc phosphate, barium sulfate, lithophones, iron oxide, ultramarine, manganese phosphate, cobalt aluminate, cobalt stannate, cobalt zincate, antimony oxide, antimony sulfide, chromium oxide, zinc chromate, mixed metal oxides based on nickel, bismuth, vanadium, molybdenum, cadmium, titanium, zinc, manganese, cobalt, iron, chromium, antimony, magnesium, aluminum (for example, nickel titanium yellow, bismuth vanadate molybdate yellow or chromium titanium yellow).

Inorganic pigments can be magnetic pigments based on pure iron, iron oxides and chromium oxides or mixed oxides, metallic effect pigments of aluminum, zinc, copper or brass as well as pearlescent pigments or fluorescent and phosphorescent pigments Examples of powdery or fibrous fillers include those, which are composed of powdery or fibrous particles of alumina, aluminum hydroxide, silica, diatomaceous earth, siliceous earth, quartz, silica gel, talc, kaolin, mica, perlite, feldspar, slate flour, calcium sulfate, barium sulfate, calcium carbonate, calcite, dolomite, glass or carbon.

Solid particles include flame retardants, such as aluminum or magnesium hydroxide, and matting agents, such as silicas.

The weight ratio of block copolymer to solid particles is not particularly critical. For organic pigments, 10 to 50% by weight of block copolymer, calculated on the weight of the organic pigment, may suitably be employed. For inorganic pigments, 1 to 30% by weight of block copolymer, calculated on the weight of the inorganic pigment, may suitably be employed.

In case of very finely divided pigments, for example some carbon blacks, 30 to 90% by weight of block copolymer, calculated on the weight of the finely divided pigment, may be employed.

The composition can suitably be employed in areas wherein solid particles are dispersed in a composition, for example coatings, paints, plastics, pigment pastes, sealants, ceramics, cosmetics, adhesives, casting compounds, fillers, battery applications, gas and oilfield applications, spackling compounds, inks and printing inks, and color compositions for flat panel displays.

The invention also relates to a process of dispersing solid particles, comprising the steps of
   a) Mixing at least one type of solid particles, and the block copolymer of the invention in a dispersion medium, and
   b) Exerting shear force to the mixture prepared in step a).

The process can be carried out in a conventional way of dispersing solid particles, as it is well known, for example in the industries concerned with coating compositions or casting compositions. The dispersion medium may be a liquid, for example an organic solvent or water. Alternatively, the dispersion medium may be a resin or polymer, for example a film forming binder. The resin or polymer may optionally be dissolved in a liquid diluent.

Examples of suitable resins or polymers include synthetic, semisynthetic or natural macromolecular substances, such as polyvinyl chloride, saturated or unsaturated polyesters, polyurethanes, polystyrene, polyacrylates, polyamides, epoxy resins, and polyolefins, such as polyethylene or polypropylene, cellulose nitrate, cellulose acetobutyrate, alkyd resins, and melamine resins.

EXAMPLES

Synthesis of Glycidylamine Monomer

In a 500 mL round bottom flask 85.7 mL (60.0 g, 820 mmol, 1.00 eq.) Diethylamine were solved in a 40 wt % sodium hydroxide solution (49.5 g, 1230 mmol, 1.50 eq. NaOH in 73.8 ml $H_2O$). Under stirring and ice cooling epichlorohydrin (96.5 mL, 114 g, 1230 mmol, 1.50 eq.) was added slowly. After complete addition, the reaction mixture was stirred for additional 24 h while warming up slowly to room temperature. During the reaction, sodium chloride precipitated as a white solid. Water was added to the reaction mixture until the white solid was completely dissolved. The aqueous reaction mixture was extracted three times with diethyl ether and the organic phase was dried with $MgSO_4$. The diethyl ether was removed in vacuum to gain the crude product.

The crude product was purified via fractional distillation in vacuum. In the first fraction, excess epichlorohydrin was collected. In the second fraction diethyl glycidylamine was received with a yield of about 60% ($T_b$=35-40° C., 12-20 mbar).

The synthesis procedure is identically for other glycidyl amine monomers like pyrrolidine glycidyl amine (PyGA) and dibenzyl glycidyl amine (DBGA).

PyGA: Yield=60% ($T_b$=45° C., 2 mbar).

Synthesis of Amphiphilic Triblock Copolymers Via Ring-Opening Polymerization Reaction Synthesis of Diblock Copolymer mPEG-Block-PDEGA-OH Variant A with Catalyst 18-Crown-6:

In a 500 mL flask equipped with a stirrer and a cooler 37.0 g (18.5 mmol, 1.00 eq.) mPEG were mixed with 0.623 g (5.60 mmol, 0.30 eq.) potassium-tert-butoxide and 1.71 g (6.50 mmol, 0.35 eq.) 18-crown-6. In the next step, 25 mL benzene and 3 mL methanol were added. The mixture was stirred 30 min at 60° C. followed by removal of the solvents and the resulting tert-butanol in vacuum gaining the deprotonated mPEG macro-initiator. The glycidyl amine monomer DEGA was added (8.1 mL, 7.2 g, 56 mmol, 3.0 eq.) into the flask under inert gas atmosphere and the reaction mixture was stirred at 75° C. for 8 hours. The full conversion of the glycidylamine epoxide monomer was verified via $^1$H-NMR spectroscopy and size exclusion chromatography (SEC) measurements. The hydroxyl-functional diblock copolymer was used in the next reaction step without further clean-up procedure.

The synthesis procedure is analogous for other glycidyl amine monomers like PyGA and DBGA.

If so desired, the preparation can be carried out without 18-crown-8 (Variant B).

Synthesis of the Amphiphilic Triblock Copolymer mPEG-Block-PDEGA-Block-PPO

The reaction mixture of the previously described step was cooled down to 40° C. and propylene oxide was added (59.7 mL, 851 mmol, 60 eq.). The reaction mixture was stirred at 40° C. for 24 h to gain the amphiphilic triblock copolymer. The conversion of the propylene oxide was monitored via $^1$H NMR spectroscopy and the final polymer was analyzed via SEC. Residual PO was removed in vacuum.

Quaternization of Tertiary Amine Groups of the Amphiphilic Triblock Copolymer mPEG-Block-P(DEGA)-block-PPO The triblock copolymer of the previous procedure was dissolved in 250 mL methanol and 5.17 mL (11.9 g, 83.9 mmol, 4.5 eq.) methyl iodide were added. Then the reaction mixture was heated to 70° C. under reflux. After 24 hours the methanol and the residual methyl iodide were removed in vacuum. The successful quaternization of the tertiary amine groups was verified via the proton shift in the $^1$H NMR of the methylene protons of the ethyl moieties. The molecular weights and polydispersities PDI ($M_w/M_n$) reported in Table 1 were determined by size exclusion chromatography using dimethyl formamide as eluent and polystyrene as calibration standard.

Table 1 provides an overview of amphiphilic triblock copolymers prepared.

TABLE 1

Overview of the synthesized amphiphilic triblock copolymers:

| | Hydrophilic Macroinitiator | | | | Diblock Copolymer | | | Triblock copolymer | | | |
|---|---|---|---|---|---|---|---|---|---|---|---|
| Nr. | EO content (mol %) | PO content (mol %) | $M_n$ (g/mol) | PDI | Glycidyl amine monomer | $M_n$ (g/mol) | PDI | Hydrophobic monomer | $M_n$ (g/mol) | PDI | Route (catalyst) |
| P1 | 100 | 0 | 1890 | 1.04 | DEGA | 2120 | 1.05 | PO | 3600 | 1.05 | A |
| P2 | 100 | 0 | 2120 | 1.05 | DEGA | 2430 | 1.05 | PO | 4700 | 1.05 | A |
| P3 | 100 | 0 | 1890 | 1.04 | DEGA | 2090 | 1.05 | PO | 4390 | 1.05 | A |
| P6 | 100 | 0 | 940 | 1.05 | DEGA | 1160 | 1.05 | PO | 2310 | 1.05 | A |
| P11 | 100 | 0 | 1970 | 1.04 | DEGA | 2020 | 1.06 | PO | 3190 | 1.06 | A |
| P12 | 100 | 0 | 1970 | 1.04 | DBGA | 2070 | 1.08 | PO | 2130 | 1.12 | A |
| P13 | 100 | 0 | 1890 | 1.07 | DBGA | 2280 | 1.08 | PO | 3250 | 1.13 | A |
| P14 | 100 | 0 | 1890 | 1.07 | DBGA | 2230 | 1.11 | PO | 3480 | 1.14 | A |
| P15 | 100 | 0 | 1890 | 1.07 | PyGA | 2330 | 1.06 | PO | 3460 | 1.10 | A |
| P16 | 100 | 0 | 1890 | 1.07 | PyGA | 2330 | 1.07 | PO | 3470 | 1.10 | A |
| P17 | 100 | 0 | 1890 | 1.07 | DEGA | 3080 | 1.06 | EHGE | 3800 | 1.19 | A |
| P20 | 100 | 0 | 1890 | 1.07 | DEGA | 2100 | 1.05 | PO | 3370 | 1.12 | B |
| P22 | 100 | 0 | 1890 | 1.07 | PyPA | 1970 | 1.07 | PO | 3340 | 1.12 | B |
| P23* | 100 | 0 | 1890 | 1.07 | DEGA | 3010 | 1.19 | PO | 3050 | 1.15 | B |
| P24* | 100 | 0 | 1890 | 1.07 | PyGA | 4030 | 1.18 | PO | 4130 | 1.13 | B |
| P25 | 100 | 0 | 1960 | 1.04 | DEGA | 2130 | 1.06 | BO | 3310 | 1.05 | B |
| P26 | 100 | 0 | 1960 | 1.04 | DEGA | 2100 | 1.05 | BO | 3610 | 1.06 | A |
| P27 | 100 | 0 | 1960 | 1.04 | PyGA | 2000 | 1.07 | BO | 3430 | 1.08 | A |
| P28 | 100 | 0 | 1960 | 1.04 | PyGA | 1970 | 1.05 | BO | 3100 | 1.11 | B |
| P31 | 90 | 10 | 2140 | 1.07 | DEGA | 2620 | 1.08 | PO | 3840 | 1.09 | A |

In the block copolymers the second block is located between the first block and the third block. Samples P23 and P24 have a different block sequence. In these samples the third block is located between the first block and the second block (mPEG-block-PPO-block-PDEGA and mPEG-block-PPO-block-PPyGA).

Table 2 provides an overview of quaternized amphiphilic triblock copolymers prepared.

TABLE 2

Overview of the quaternized amphiphilic block copolymers:

| Nr. | Sample of amphiphilic tri block copolymer | Quaternization reagent |
|---|---|---|
| Q1 | P1 | MeI |
| Q2 | P2 | MeI |
| Q3 | P3 | MeI |
| Q6 | P6 | MeI |
| Q11 | P14 | MeI |
| Q12 | P15 | MeI |
| Q13 | P16 | MeI |
| Q14 | P17 | MeI |
| Q15 | P20 | MeI |
| Q16 | P22 | MeI |
| Q17 | P23* | MeI |

TABLE 2-continued

Overview of the quaternized amphiphilic block copolymers:

| Nr. | Sample of amphiphilic tri block copolymer | Quaternization reagent |
|---|---|---|
| Q18 | P24* | MeI |
| Q19 | P25 | MeI |

Synthesis of Amphiphilic Triblock Copolymer Having Ester Units in the Non-Polar Block Polyester Synthesis with the Diblock Copolymer Macroinitiator In a 250 mL Schlenk flask, 37.0 g (15.9 mmol, 1.00 eq.) of the diblock copolymer mPEG-PDEGA as described above were dissolved in 30 mL benzene and the mixture was dried via azeotrope distillation of the benzene for 12 h at 60° C. under reduced pressure. Then 31.8 mL (32.7 g, 287 mmol, 18.0 eq.) freshly distilled and dried ε-caprolactone were added under inert gas atmosphere and 0.46 mL (0.58 g, 1.43 mmol, 0.005 eq.) tin(II)-octanoate were added. The mixture was heated at 120° C. until full conversion of lactone monomer was reached. The full conversion was verified via $^1$H NMR spectroscopy and SEC measurements.

Table 3 provides an overview of amphiphilic triblock copolymers having ester units:

| | Hydrophilic Macroinitiator | | | Diblock Copolymer | | | Triblock copolymer | | |
|---|---|---|---|---|---|---|---|---|---|
| | EO (mol %) | $M_n$ (g/mol) | PDI | Glycidyl amine monomer | $M_n$ (g/mol) | PDI | Hydrophobic monomer | $M_n$ (g/mol) | PDI |
| PE1 | 100 | 1960 | 1.04 | DEGA | 2030 | 1.06 | CL | 4010 | 1.48 |
| PE2 | 100 | 1960 | 1.04 | DEGA | 2140 | 1.06 | CL/VL (3:1) | 3790 | 1.40 |

-continued

| | Diblock Copolymer | | | | | | Triblock copolymer | | |
|---|---|---|---|---|---|---|---|---|---|
| | Hydrophilic Macroinitiator | | | Glycidyl | | | | | |
| | EO (mol %) | $M_n$ (g/mol) | PDI | amine monomer | $M_n$ (g/mol) | PDI | Hydrophobic monomer | $M_n$ (g/mol) | PDI |
| PE3 | 100 | 1960 | 1.04 | DEGA | 2140 | 1.06 | CL/VL (1:1) | 3690 | 1.36 |
| PE4 | 100 | 1960 | 1.04 | DEGA | 2150 | 1.06 | L-Lactide | 2480 | 1.42 |

CL in Table 3 represents ε-caprolactone, VL represents δ-valerolactone. The ratios of CL and VL are molar ratios.

Synthesis of Isocyanate-functional Non-polar Block 0.25 mol (500 g) of polypropylenegycol monobutylether (Mn 2000 g/mol) was added over 2 hours at room temperature to 0.62 mol (108.75 g) of 2,4-toluene diisocyanate (TDI). The temperature was held below 45° C. After the end of the addition, stirring was continued for 2.5 h. The excess isocyanate was removed by vacuum (0.1 mbar) distillation from 150 to 170° C. The NCO content was 2.36%, the free TDI content <0.5%.

Synthesis of the Amphiphilic Triblock Copolymer Via Isocyanate Coupling

In a 250 mL Schlenk-flask, 30.0 g (12.5 mmol, 1.00 eq.) of the diblock copolymer mPEG-PDEGA of polymer P1 described above and 22.4 g Bu-PPO—NCO of step 4.1 (NCO-value=2.36%, 12.5 mmol, 1.00 eq.) were mixed and stirred under inert gas atmosphere at 95° C. for 24 h. The successful coupling was verified via SEC measurements.

The results are summarized in Table 4 below:

| | Diblock Copolymer | | | | | |
|---|---|---|---|---|---|---|
| | Glycidyl | | | Terblock copolymer | | |
| Nr. | amine monomer | $M_n$ (g/mol) | PDI | Hydrophobic building block | $M_n$ (g/mol) | PDI |
| PX2 | DEGA | 2160 | 1.05 | $PPO_{43}$-NCO | 3280 | 1.23 |
| PX3 | PyGA | 1980 | 1.06 | $PPO_{43}$-NCO | 2740 | 1.25 |

Use of the polymers of the invention as additive for production of pigment concentrates and use thereof in varnish systems

TABLE 5

| Starting Materials | |
|---|---|
| Setal 1715 VX-74 | Saturated polyester, manufacturer: ALLNEX |
| Setamine US-138 BB-70 | Partly butylated melamine, manufacturer: ALLNEX |
| Paraloid B-66* 50% in Xylol | Thermoplastic acrylate resin, manufacturer: DOW Chemicals |
| Laropal A 81 60% | Aldehyde resin, manufacturer: BASF |
| Macrynal SM 515 (70%) | Hydroxyl functional acrylic resin, manufacturer: ALLNEX |
| Desmodur N 75 | Aliphatic polyisocyanate (HDI biuret), manufacturer: COVESTRO |
| Setalux 1756 VV-65 | Thermosetting hydroxylated acrylic copolymer, manufacturer: ALLNEX |
| Walsroder NC-Chips E510 ESO | Nitrocellulose mixture with plasticizer, manufacturer: DOW Chemicals |

TABLE 5-continued

| Starting Materials | |
|---|---|
| Synthalat E405 60% Xylol | Short-oil non-drying alkyd resin, manufacturer: SYNTHOPOL |
| Dowanol PMA | Propylene glycol methyl ether acetate, manufacturer: Dow Chemicals |
| Shellsol A | Solvent naphtha, light aromatic, C9 and C10 |
| DIDP | Diisodecylphthalat |
| Hostaperm Violet ER02 | Quinacridone pigment (P.V. 19), manufacturer: CLARIANT |
| Spezial schwarz 4 | Carbon black pigment (P. Bk. 7), manufacturer: ORION Engineered Carbons GmbH |
| Paliogen ® Maroon L 3920 | transparent organic pigment PR 179 (perylene), manufacturer: BASF |
| Carbon Black FW 200 | Carbon black pigment (P. Bk. 7), manufacturer: Orion Engineered Carbons GmbH |
| Raven 5000 Ultra III beads | Carbon black pigment for high jetness, manufacturer: Birla Carbon |
| Hostaperm Pink E | Quinacridone red (P.R. 122), manufacturer: Clariant |
| Bayferrox Red 130M | Iron oxide red (P.R. 101), manufacturer Lanxess |
| BYK-052 | Silicone-free defoamer, manufacturer: BYK-Chemie GmbH |
| BYK-300 | Polyether modified polydimethylsiloxane, manufacturer: BYK-Chemie GmbH |
| BYK-306 | Substrate wetting agent, manufacturer: BYK-Chemie GmbH |
| BYK-310 | Substrate wetting agent, manufacturer: BYK-Chemie GmbH |
| Garamite 7305 | Benzalkonium Sepiolite (and) Benzalkonium Montmorillonite, manufacturer BYK-Chemie GmbH |

System 1: Saturated Polyester-Melamine Baking System

Production of the Millbases Based on Saturated Polyester Resin

The Setal 1715 resin, solvent, dispersing additive and pigment were weighed into 100 mL glass bottles to obtain 50 g millbase. Subsequently, 50 g of glass beads (1 mm) were weighed in.

TABLE 6

| Composition of the Saturated Polyester millbases: | | |
|---|---|---|
| | SP 1 (black) | SP 2 (violet) |
| Setal 1715 VX-74 | 12.1 | 14.6 |
| Spezial schwarz 4 | 6.0 | |
| Hostaperm Violet ER02 | | 6.0 |
| PMA | 28.9 | 28.2 |
| Dispersing Additive | 3.0 | 1.2 |
| Total Pigment content (%) | 12 | 12 |
| Dispersant (% s.o.p.) | 50 | 20 |

Grinding Conditions
  Equipment: Lau Disperser DAS 200
  Dispersing Time: 180 min, air cooling power at level 3
  Ratio of millbase to glass beads (diameter 1 mm): 1:1 (parts by weight)
  Evaluation of the viscosity of compositions was assessed using grades: 1 (low viscous), 2 (viscous), 3 (sheer thinning), 4 (high viscous), 5 (not flowable).

Production of the Saturated Polyester Letdown System
  Setal 1715 VX-74, Setamine US 138 BB-70, solvent and surface additive were weighed into a 2.5 L PE bucket and homogenized with a Dispermat CV (65 mm toothed disk) at 2000 rpm for 5 min.

TABLE 7

Composition of the Saturated Polyester Letdown System:

| | |
|---|---|
| Setal 1715 VX-74 | 400 |
| Setamine US 138 BB-70 | 210 |
| Shellsol A | 108 |
| Butyl glycol acetate | 30 |
| BYK-310 | 2 |

Production of the Pigmented Saturated Polyester Top Coats

The Saturated Polyester Letdown System and the Saturated Polyester millbase were weighed into a PE cup and mixed with a spatula. Subsequently, the completed Setal 1715 Top Coat systems were homogenized in an ANDALOK shaker for 10 min.

TABLE 8

Composition of the Pigmented Saturated Polyester Top Coat Systems

| | Setal 1715-T1 | Setal 1715-T2 |
|---|---|---|
| Saturated Polyester Letdown System | 15.0 | 15.0 |
| SP 1 (black) | 2.0 | |
| SP 2 (violet) | | 5.0 |
| Pigment content (%) | 1.4 | 3.0 |

Application and Evaluation of the Pigmented Saturated Polyester Top Coat Systems The pigmented saturated polyester top coat systems were bar-coated onto a Polyethylene terephthalate (PET) film (50 µm). After a flash-off time of 15 min, the films were cured in the oven at 140° C. for 15 min. Subsequently, gloss was measured with a BYK micro haze plus instrument at an angle of 20°. In each case, high values for gloss are considered to be positive results, as they are generally a sign for an even and homogenous distribution of well dispersed pigment in the coating. In addition, the optical color intensity and transparency through the drawdowns onto the PE film was assessed using grades: 1 (excellent), 2 (good), 3 (satisfactory), 4 (sufficient), 5 (unacceptable).

TABLE 9

| | Setal 1715-T1 (black) | | | Setal 1715-T2 (violet) | | |
|---|---|---|---|---|---|---|
| Sample | Viscosity | Gloss 20° | Transparency | Viscosity | Gloss 20° | Transparency |
| control | 3 | 85 | 5 | 3 | 81 | 5 |
| P2 | 1 | 88 | 1 | | | |
| Q2 | 1 | 88 | 3 | 1 | 89 | 2 |

TABLE 9-continued

| | Setal 1715-T1 (black) | | | Setal 1715-T2 (violet) | | |
|---|---|---|---|---|---|---|
| Sample | Viscosity | Gloss 20° | Transparency | Viscosity | Gloss 20° | Transparency |
| P3 | 1 | 88 | 1 | | | |
| Q3 | 1 | 88 | 2 | 1 | 89 | 2 |
| Q6 | | | | 1 | 85 | 2 |
| Q12 | 1 | 87 | 3 | 1 | 89 | 2 |
| P16 | 1 | 87 | 2 | | | |
| Q13 | 1 | 87 | 4 | 1 | 89 | 2 |
| P22 | 1 | 88 | 2 | | | |
| Q16 | 1 | 88 | 3 | 2 | 88 | 2 |
| P23 | 1 | 88 | 2-3 | 2-3 | 82 | 4 |
| Q17 | 1 | 88 | 5 | 2-3 | 82 | 4-5 |
| P24 | 1 | 87 | 3 | 2-3 | 83 | 4-5 |
| Q18 | 1 | 88 | 5 | 2-3 | 84 | 4 |
| P25 | 1 | 85 | 1 | | | |
| Q19 | 1 | 88 | 3 | 2 | 86 | 2 |
| P26 | 1 | 86 | 1 | | | |
| P27 | 1 | 87 | 1 | | | |
| P28 | 1 | 87 | 1 | | | |
| PX2 | 1 | 87 | 1 | | | |
| PX3 | 1 | 87 | 3 | | | |

Viscosity ratings in Table 8 relate to the viscosity of the mill bases. The control sample was prepared without wetting and dispersing additive.

System 2: Thermoplastic Acrylate Resin

Production of Millbases Based on a Thermoplastic Acrylate Resin

The Paraloid B-66 resin, solvent, dispersing additive and pigment were weighed into 100 mL glass bottles to obtain 50 g millbase. Subsequently, 50 g of glass beads (1 mm) were weighed in.

TABLE 10

Composition of the TPA millbases:

| | TPA 1 (black) | TPA 2 (red) |
|---|---|---|
| Paraloid B-66 (50% in xylene) | 20.5 | 15.5 |
| Carbon Black FW 200 | 3.0 | |
| Perylen Red Paliogen ® Maroon L 3920 | | 6.0 |
| Dispersing Additive | 2.1 | 1.5 |
| n-Butanol | 5.0 | 5.0 |
| Butyl acetate:Xylene (1:1) | 19.4 | 22.0 |
| Total Pigment content (%) | 6 | 12 |
| Dispersant (% s.o.p.) | 70 | 25 |

Grinding Conditions
  Equipment: Lau Disperser DAS 200
  Dispersing Time: 180 min, air cooling power at level 3
  Ratio of millbase to glass beads (diameter 1 mm): 1:1 (parts by weight)
  Evaluation of the millbase viscosity was assessed using grades: 1 (thin viscous), 2 (viscous), 3 (sheer thinning), 4 (high viscous), 5 (not flowable).

Production of the TPA-Based Letdown System:
  Paraloid B-66, solvent, surface additive and plasticizer were weighed into a 2.5 L PE bucket and homogenized with a Dispermat CV (65 mm toothed disk) at 2000 rpm for 5 min.

TABLE 11

Composition of the TPA Letdown System:

| | |
|---|---|
| Paraloid B-66 (50% in xylene) | 705 |
| n-Butanol | 140 |
| Shellsol A | 47 |
| Xylene | 47 |
| DIDP | 60 |
| BYK-306 | 1 |

Production of the Pigmented TPA Letdown System

The TPA letdown system and the TPA-based millbases were weighed into a PE cup and mixed with a spatula. Subsequently, the completed letdown systems were homogenized in an ANDALOK shaker for 10 min.

TABLE 12

Composition of the Pigmented TPA Letdown Systems

| | TPA-B1 | TPA-B2 |
|---|---|---|
| TPA letdown system | 15.0 | 15.0 |
| TPA 1 (black) | 5.0 | |
| TPA 2 (red) | | 5.0 |
| Pigment content (%) | 1.5 | 3.0 |

Application and Evaluation of the Pigmented TPA Letdown System

The pigmented TPA letdown system were bar-coated onto a PET film (50 μm) and dried at 22° C. for 24 h. Subsequently, gloss was measured with a BYK micro haze plus instrument at an angle of 20°. In each case, high values for gloss are considered to be positive results. In addition, the optical color intensity and transparency through the drawdowns onto the PE film was assessed using grades: 1 (excellent), 2 (good), 3 (satisfactory), 4 (sufficient), 5 (unacceptable).

TABLE 13

| | TPA-B1 (black) | | | TPA-B2 (red) | | |
|---|---|---|---|---|---|---|
| Sample | Viscosity | Gloss 20° | Transparency | Viscosity | Gloss 20° | Transparency |
| control | 5 | 43 | 4 | 3 | 70 | 5 |
| P1 | 2 | 80 | 3 | 3 | 71 | 3 |
| P2 | 1 | 80 | 1 | 4 | 72 | 3 |
| Q2 | 2 | 78 | 3 | 4 | 62 | 2 |
| P3 | 1 | 80 | 1 | 3 | 73 | 3 |
| Q3 | 2 | 79 | 3 | 3 | 77 | 3 |
| P6 | 2-3 | 79 | 3 | 3 | 76 | 3 |
| P11 | 2 | 80 | 1 | 3 | 72 | 2 |
| P23 | 2-3 | 79 | 4 | 4 | 67 | 3 |
| Q17 | 2-3 | 74 | 5 | 2 | 60 | 5 |
| P24 | 2-3 | 75 | 4-5 | 4 | 66 | 3 |
| Q18 | 2-3 | 74 | 5 | 2 | 54 | 5 |
| P25 | 2 | 80 | 1 | | | |
| Q19 | 2-3 | 79 | 3 | | | |
| P26 | 2 | 79 | 1 | | | |
| P27 | 2 | 80 | 1 | | | |
| P28 | 2 | 80 | 1 | | | |
| PX2 | 2 | 80 | 3 | | | |

Viscosity ratings in Table 12 relate to the viscosity of the mill bases. The control sample was prepared without wetting and dispersing additive.

System 3: Two-Component Acrylic-Isocyanate Coating

Production of Millbases Based on an Aldehyde Resin

The Laropal A81 resin, solvent, dispersing additive, pigment and optionally Garamite 7305 were weighed into 100 mL glass bottles to obtain 50 g millbase. Subsequently, 50 g of glass beads (1 mm) were weighed in.

TABLE 14

Composition of the aldehyde resin (AR) millbases:

| | AR 1 (black) | AR 2 (pink) | AR 3 (red) |
|---|---|---|---|
| Laropal A81 (60%) | 16.7 | 11.5 | 10.1 |
| PMA | 27.3 | 30.5 | 10.1 |
| Dispersing Additive | 2.0 | 2.0 | 2.1 |
| Raven 5000 Ultra III beads | 4.0 | | |
| Hostaperm Rosa E | | 6.0 | |
| Bayferrox 130M | | | 27.5 |
| Garamite 7305 | | | 0.2 |
| Total Pigment content (%) | 8 | 12 | 55 |
| Dispersant (% s.o.p.) | 50 | 33 | 7.5 |

Grinding Conditions

Equipment: Lau Disperser DAS 200

Dispersing Time: 180 min for Laropal 3, 240 min for Laropal 1 and Laropal 2, air cooling power at level 3

Ratio of millbase to glass beads (diameter 1 mm): 1:1 (parts by weight)

Evaluation of the millbase viscosity was assessed using grades: 1 (thin viscous), 2 (viscous), 3 (sheer thinning), 4 (high viscous), 5 (not flowable).

Production of the Letdown for Two-Component Acrylic-Isocyanate Coating

Marcynal SM 515, solvent and surface additive were weighed into a 2.5 L PE bucket and homogenized with a Dispermat CV (65 mm toothed disk) at 2000 rpm for 5 min.

TABLE 15

Composition of the letdown for the Two-Component Acrylic-Isocyanate Coating:

| | |
|---|---|
| Marcynal SM 515 (70%) | 750 |
| Shellsol A | 128 |
| Butylacetate | 120 |
| BYK-300 | 2 |

Production of the Pigmented Two-Component Acrylic-Isocyanate Top Coats

The letdown and the aldehyde resin based millbases were weighed into a PE cup and mixed with a spatula. Subsequently, all the mixtures were homogenized in an ANDALOK shaker for 10 min. Afterwards, the Desmodur N-75 was added and the pigmented 2 component Acrylic-Isocyanate top coats were homogenized in an ANDALOK shaker for 2 min.

TABLE 16

Composition of the Pigmented 2 Component Acrylic-Isocyanate Top Coats

| | TC AI 1 | TC AI 2 | TC AI 3 |
|---|---|---|---|
| Clear Coat | 15.0 | 15.0 | 12.5 |
| AR 1 (black) | 4.5 | | |
| AR 2 (pink) | | 6.6 | |
| AR 3 (red) | | | 3.0 |
| Desmodur N 75 | 5.0 | 5.0 | 4.5 |
| Pigment content (%) | 1.45 | 3 | 8 |

Application and Evaluation of the Pigmented Two-Component Acrylic-Isocyanate Top Coats TC AI 1 (Black) and TC AI 2 (Pink):

The pigmented two-component Acrylic-Isocyanate top coats were bar-coated onto a PET film (50 μm). After a flash-off time of 30 min, the films were cured in the oven at 60° C. for 30 min. Subsequently. Subsequently, haze was measured with a BYK micro haze plus instrument at an angle of 20°. Transparency through the drawdowns onto the PE film was assessed using grades: 1 (excellent), 2 (good), 3 (satisfactory), 4 (sufficient), 5 (unacceptable).

TC AI 3 (Red):

The pigmented two-component Acrylic-Isocyanate top coats were bar-coated onto a contrast chart (100 μm). After a while, when film become tacky, a Rub-Out Test was performed. The films were cured in the oven at 60° C. for 30 min. Subsequently, haze was measured with a BYK micro haze plus instrument at an angle of 20°. Low values for haze are considered to be positive results. In addition, the ΔE-values—comparing the color values of rubbed vs. non-rubbed surface—were measured by using a BYK Spectro Guide Sphere d8. Low values for ΔE are considered to be positive results.

TABLE 17

| Sample | TC AI (black) Haze | TC AI (black) Transp | TC AI 2 (Pink) Haze | TC AI 2 (Pink) Transp | TC AI 3 (red) Haze | TC AI 3 (red) ΔE |
|---|---|---|---|---|---|---|
| Control | 13 | 4 | 12 | 5 | 13 | 1.00 |
| P1 | 10 | 1 | | | 10 | 0.60 |
| Q1 | | | 12 | 2 | 11 | 0.36 |
| P2 | 10 | 1 | 13 | 3 | 10 | 0.78 |
| Q2 | 10 | 2 | 12 | 1 | 11 | 0.41 |
| P3 | 10 | 1 | 11 | 3 | 10 | 0.73 |
| Q3 | 10 | 1 | 12 | 1 | 13 | 0.53 |

System 4: Acrylic-Melamine Baking Finish

Production of Millbases Based on an Aldehyde Resin

Usage of the aldehyde resin millbases previously produced: AR 1, AR 2 and AR 3

Production of the Letdown for the Acrylic-Melamine Baking Finish

Setalux 1756 VV-65, Setamine US 138 BB-70, solvent and surface additive were weighed into a 2.5 L PE bucket and homogenized with a Dispermat CV (65 mm toothed disk) at 2000 rpm for 5 min.

TABLE 18

Composition of the letdown for the Acrylic-Melamine Baking Finish:

| | |
|---|---|
| Setalux 1756 VV-65 | 600 |
| Setamine US 138 BB-70 | 240 |
| Shellsol A | 80 |
| Xylene | 78 |
| BYK-310 | 2 |

Production of the Pigmented Acrylic-Melamine Baking Finish Top Coats

The letdown for the Acrylic-Melamine Baking Finish and the aldehyde resin based millbases were weighed into a PE cup and mixed with a spatula. Subsequently, the completed Acrylic-Melamine baking finish top coat systems were homogenized in an ANDALOK shaker for 10 min.

TABLE 19

Composition of the Pigmented Acrylic-Melamine Baking Finish Top Coats

| | AM BF 1 | AM BF 2 | AM BF 3 |
|---|---|---|---|
| Clear Coat | 15.0 | 15.0 | 17.0 |
| AR 1 (black) | 3.3 | | |
| AR 2 (pink) | | 5 | |
| AR 3 (red) | | | 3.0 |
| Pigment content (%) | 1.45 | 3 | 8 |

Application and Evaluation of the Acrylic-Melamine Baking Finish Top Coats

AM BF 1 (Black) and AM BF 2 (Pink):

The pigmented Acrylic-Melamine Baking Finish Top Coats were bar-coated onto a PET film (50 μm). After a flash-off time of 15 min, the films were cured in the oven at 140° C. for 25 min. Subsequently, haze was measured with a BYK micro haze plus instrument at an angle of 20°. Transparency through the drawdowns onto the PE film was assessed using grades: 1 (excellent), 2 (good), 3 (satisfactory), 4 (sufficient), 5 (unacceptable). Transparency through the drawdowns onto the PE film was assessed using grades: 1 (excellent), 2 (good), 3 (satisfactory), 4 (sufficient), 5 (unacceptable).

BF 3 (Red):

The pigmented Acrylic-Melamine Baking Finish Top Coats were bar-coated onto a contrast chart (100 μm). After a while, when film become tacky, Rub-Out Tests were performed. The films were cured in the oven at 140° C. for 25 min. Subsequently, haze was measured with a BYK micro haze plus instrument at an angle of 20°. Low values for haze are considered to be positive results. In addition, the ΔE-values—comparing the color values of rubbed vs. non-rubbed surface —were measured by using a BYK Spectro Guide Sphere d8. Low values for ΔE are considered to be positive results.

TABLE 20

| Sample | AM BF 1 (black) Haze | AM BF 1 (black) Transp. | AM BF 2 (pink) Haze | AM BF 2 (pink) Transp. | AM BF 3 (red) Haze | AM BF 3 (red) ΔE |
|---|---|---|---|---|---|---|
| Control | 13 | 5 | 21 | 5 | 47 | 1.04 |
| P1 | 10 | 1 | | | | |
| P2 | 10 | 1 | | | | |
| Q2 | 10 | 3 | 16 | 2 | 19 | 0.56 |
| P3 | 10 | 1 | | | | |
| Q3 | 12 | 1 | 16 | 2 | 18 | 0.50 |

The invention claimed is:

1. A block copolymer comprising
   i) A first block wherein at least 65 mol-% of the repeating units of the first block are repeating units of formula (I)

$$—[CH_2—CH_2—O]—\qquad (I),$$

ii) A second block wherein at least 90 mol-% of the repeating units of the second block are repeating units of at least one of formulae (II) or (III),

-continued

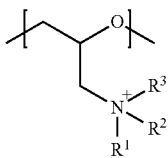

(III)

wherein the groups $R^1$, $R^2$, and $R^3$ independent of each occurrence are selected from hydrocarbyl groups having 1 to 40 carbon atoms, which are optionally substituted by ether or hydroxyl groups, and wherein the groups $R^1$ and $R^2$ are optionally linked to each other such that a nitrogen heterocyclic structure is present, iii) A third block which is different from the first block and the second block and which is more hydrophobic than the first block.

2. The block copolymer of claim 1, wherein the second block is located between the first block and the third block.

3. The block copolymer of claim 1, wherein the first block consists essentially of repeating units of formula (I).

4. The block copolymer of claim 1, wherein the first block is terminated by an alkyl group having 1 to 12 carbon atoms.

5. The block copolymer of claim 1, wherein the first block comprises 10 to 100 repeating units of formula (I).

6. The block copolymer of claim 1, wherein the sum of repeating units for formulae (II) and (III) in the second block is in the range of 2 to 10.

7. The block copolymer of claim 1, wherein counter ions of the repeating units of formula (III) comprise at least one of chloride, bromide, iodide, tosylate, methylsulfate, and carboxylate.

8. The block copolymer of claim 1, wherein the groups $R^1$, $R^2$, and $R^3$ independent of each occurrence are selected from hydrocarbyl groups having 1 to 18 carbon atoms, which are optionally substituted by ether or hydroxyl groups.

9. The block copolymer of claim 1, wherein the third block comprises repeating units of the formula (IV)

$$—[CH_2—CHR^4—O]— \quad (IV),$$

wherein the groups $R^4$ independent of each occurrence are selected from hydrocarbyl groups having 1 to 18 carbon atoms, which are optionally substituted by ether groups.

10. The block copolymer according to claim 9, wherein the third block comprises 15 to 100 repeating units of formula (IV).

11. The block copolymer of claim 1, wherein the third block comprises repeating units having ester-functional groups.

12. The block copolymer of claim 1, wherein the third block is linked to the second block via a linking group having two urethane groups.

13. The block copolymer of claim 1, wherein the third block is linked to the second block via an ester or ether group.

14. A composition comprising solid particles and the block copolymer of claim 1.

15. A process of dispersing solid particles, the process comprising:
a) Mixing at least one type of solid particles, and the block copolymer of claim 1 in a dispersion medium, and
b) Exerting shear force to the mixture prepared in a).

16. A pigment dispersion comprising the block copolymer of claim 1 and a pigment.

17. A process of preparing a block copolymer, the process comprising:
a) Providing a first polymer block having at least 65 mol-% of repeating units of formula (I) —[CH2-CH2-O]—(I), and having one end group selected from hydroxyl and secondary amine,
b) Providing a glycidyl amine of general formula (V)

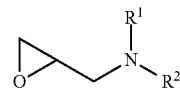

(V)

wherein $R^1$ and $R^2$ independent of each occurrence are selected from hydrocarbyl groups having 1 to 40 carbon atoms, which are optionally substituted by ether or hydroxyl groups, and wherein the groups R1 and R2 are optionally linked to each other such that a nitrogen heterocyclic structure is present, and subjecting the glycidyl amine of formula (V) to ring opening polymerization in the presence of the first polymer block provided i a) to prepare a diblock copolymer,
c) Providing a monomer mixture comprising at least one of epoxide and lactone, and subjecting the monomer mixture to ring opening polymerization in the presence of the diblock copolymer prepared in b).

* * * * *